US011734936B2

(12) United States Patent
Honegger

(10) Patent No.: US 11,734,936 B2
(45) Date of Patent: Aug. 22, 2023

(54) DIGITAL MICROSCOPE SYSTEM, METHOD FOR OPERATING THE SAME AND COMPUTER PROGRAM

(71) Applicant: LEICA INSTRUMENTS (SINGAPORE) PTE. LTD., Singapore (SG)

(72) Inventor: Marc Honegger, Romanshorn (CH)

(73) Assignee: Leica Instruments (Singapore) Pte. Ltd., Singapore (SG)

( * ) Notice: Subject to any disclaimer, the term of this patent is extended or adjusted under 35 U.S.C. 154(b) by 114 days.

(21) Appl. No.: 17/417,813

(22) PCT Filed: Dec. 19, 2019

(86) PCT No.: PCT/EP2019/086175
§ 371 (c)(1),
(2) Date: Jun. 24, 2021

(87) PCT Pub. No.: WO2020/136067
PCT Pub. Date: Jul. 2, 2020

(65) Prior Publication Data
US 2022/0075986 A1    Mar. 10, 2022

(30) Foreign Application Priority Data

Dec. 27, 2018  (EP) .................................... 18248048

(51) Int. Cl.
*G06V 20/69* (2022.01)
*G06V 10/25* (2022.01)
(Continued)

(52) U.S. Cl.
CPC ............ *G06V 20/693* (2022.01); *G06F 18/41* (2023.01); *G06V 10/25* (2022.01); *G06V 20/695* (2022.01);
(Continued)

(58) Field of Classification Search
None
See application file for complete search history.

(56) References Cited

U.S. PATENT DOCUMENTS

2002/0089740 A1   7/2002  Wetzel et al.
2006/0092505 A1*  5/2006  Abnet .................. G02B 21/365
                                                    359/368
(Continued)

FOREIGN PATENT DOCUMENTS

CN       101441154 A  *  5/2009
CN       203405620 U  *  1/2014
(Continued)

*Primary Examiner* — Mohammed Rachedine
(74) *Attorney, Agent, or Firm* — Hodgson Russ LLP

(57) ABSTRACT

A digital microscope system comprises an imaging device configured to generate digital image data representing a target region of an object, the target region being determined by a changeable setting of the imaging device; and a controller configured to generate monitor image data corresponding to the digital image data generated in accordance with the setting, the monitor image data being configured to be displayed as a monitor image; wherein the controller is further configured to change the setting in response to a user input; and wherein the controller is further configured to compensate for a delay in updating the monitor image data in accordance with the changed setting by storing the digital image data generated in accordance with the unchanged setting in response to the user input and generating simulation monitor image data by performing digital image processing on the stored digital image data taking into account the changed setting, the simulation monitor image data being configured to be displayed as a simulation monitor image during the delay.

10 Claims, 6 Drawing Sheets

(51) Int. Cl.
*G06T 3/40* (2006.01)
*H04N 7/18* (2006.01)
*G02B 21/36* (2006.01)
*G02B 21/18* (2006.01)
*G02B 21/24* (2006.01)
*G02B 21/26* (2006.01)
*G02B 21/02* (2006.01)
*G02B 15/02* (2006.01)
*G06F 18/40* (2023.01)

(52) U.S. Cl.
CPC ...... *G06F 2218/00* (2023.01); *G06F 2218/08* (2023.01)

(56) References Cited

U.S. PATENT DOCUMENTS

| | | | |
|---|---|---|---|
| 2008/0225278 A1* | 9/2008 | Namba | G02B 21/244 356/123 |
| 2011/0149387 A1 | 6/2011 | Sukekawa | |
| 2012/0044342 A1 | 2/2012 | Hing et al. | |
| 2013/0076888 A1 | 3/2013 | Hibino et al. | |
| 2013/0162803 A1* | 6/2013 | Steckhan | G06T 3/4038 348/79 |
| 2013/0201551 A1* | 8/2013 | Obrebski | G02F 1/29 359/320 |
| 2014/0063226 A1* | 3/2014 | Kawata | G02B 21/36 348/80 |

FOREIGN PATENT DOCUMENTS

| | | | | |
|---|---|---|---|---|
| CN | 102589453 B | * | 4/2014 | |
| CN | 103958588 A | * | 7/2014 | B60C 1/00 |
| DE | 102011107636 A1 | * | 1/2013 | G02B 15/04 |

* cited by examiner

DIGITAL MICROSCOPE SYSTEM, METHOD FOR OPERATING THE SAME AND COMPUTER PROGRAM

CROSS-REFERENCE TO RELATED APPLICATIONS

The present application is the U.S. national phase of International Application No. PCT/EP2019/086175 filed Dec. 19, 2019, which claims priority of European Application No. 18248048.3 filed Dec. 27, 2018, the entire disclosure of which is incorporated herein by reference.

TECHNICAL FIELD

The present disclosure relates to a digital microscope system, a method for operating a digital microscope system, and a computer program with a program code for performing the method.

BACKGROUND

Digital microscope systems are known to include an imaging device which is configured to generate digital image data representing a target region of an object. For this, the imaging device e.g. comprises a digital camera. Such a digital microscope system further comprises microscope components being controlled in order to change the position or the size of the target region to be imaged by the imaging device. These microscope components comprise e.g. a microscope stage which can be moved laterally with respect to an optical axis of the imaging device, a magnification changing system enabling an adjustment of the size of the target region by varying the magnification of an optical system included in the imaging device, and a focusing system. An user may control the afore-mentioned microscope components in order to adjust the target region to be imaged via a user interface and input elements as for example a keyboard, a computer mouse, etc. The user interface may also comprise a touch screen which is integrated with the monitor screen.

A live image of the target region is displayed on the monitor, and the user can navigate through the live image by operating the touch screen or another input element. However, there is often a certain delay between the user input and the operations of the microscope components which are to be actuated according to the user input. Such a delay or latency is made up of the sum of individual latencies occurring in those microscope components being involved in operating according to the user input. Such latencies may refer to image acquisition, image transmission, image output, physical delays of the motorized microscope functions or various delays in the software.

As long as the total latency between the user input and the operation of the respective microscope component is not too large, such a latency may be tolerated. Thus, latencies of approximately 80 ms are not perceivable by the user. However, in case the total latency is larger, the user perceives the navigation through the image displayed on the monitor as unresponsive.

In principle, it may be envisaged to reduce the latencies of individual microscope components by additional effort. However, such an approach is relatively cost-inventive due to additional development and hardware costs.

Therefore, it is an object of the present disclosure to provide a digital microscope system which can be operated in a responsive manner.

SUMMARY

In order to achieve the afore-mentioned object, a digital microscope system is provided, comprising an imaging device configured to generate digital image data representing a target region of an object, the target region being determined by a changeable setting of the imaging device; and a controller configured to generate monitor image data corresponding to the digital image data generated in accordance with the setting, the monitor image data being configured to be displayed as a monitor image. The controller is configured to change the setting in response to a user input. The controller is further configured to compensate for a delay in updating the monitor image data in accordance with the changed setting by storing the digital image data generated in accordance with the unchanged setting in response to the user input and generating simulation monitor image data by performing digital image processing on the stored digital image data taking into account the changed setting, the simulation monitor image data being configured to be displayed as a simulation monitor image during the delay.

The afore-mentioned setting of the imaging device comprises any setting for determining the target region of the object which is to be imaged by the imaging device. For instance, the setting may comprise a lateral position of the target region with respect to the imaging device, a magnification for imaging the target region, a focusing state, etc. In particular, the changeable setting may refer to any component of the imaging device which can be controlled in response to the user input for determining the target region, e.g. a motorized microscope stage, a motorized focusing system, a motorized magnification changing system, etc.

According to an embodiment of the disclosure, a simulation monitor image can be displayed during the delay between the point in time at which the user input for changing the setting is received, and the point in time at which the change of setting has actually been completed. For this, digital image processing is performed on the digital image data which have been generated on the basis of the unchanged setting, wherein the digital image processing takes into account the new setting being changed by the user input. Thus, it is possible to display a monitor image reflecting the changed setting at a time at which the change of the setting has not yet been completed. As a result, the user is enabled to operate the digital microscope system in a manner which is perceived as responsive and intuitive.

In contrast to conventional systems, the user can intuitively perform all operations of the digital microscope systems through user actions while observing the corresponding reactions of the system directly on the monitor. In other words, as the system reaction in response to the user action, i.e. the user input, exhibits a certain delay e.g. due to hardware and image transfer latencies, the monitor image is digitally simulated during the delay. For example, when zooming is performed, the current digital image generated by the imaging device is frozen, i.e. stored in a first step, and a digitally enlarged or reduced version of the image is displayed on the monitor as long as the zooming is not yet completed. Thus, although the operation of the imaging device for zooming is not yet completed at this point of time, the user can already observe an approximation of the monitor image resulting from the change of setting. After a certain time, when the microscope hardware has actually achieved the desired magnification corresponding to the changed zoom setting, the simulation monitor image displayed on the monitor is replaced with the live image corresponding to the changed setting.

The above principle also applies to any other setting as for example laterally shifting the microscope stage relative to the optical axis of the imaging device or axially shifting the microscope stage along the optical axis relative to the imaging device for changing the object plane onto which the imaging device is focused.

Further, compared with conventional microscope systems, a further advantage can be seen in avoiding any additional effort for reducing latency times of the system, as such an effort is often associated with cost-intensive development and hardware costs.

According to an embodiment of the present disclosure, it is preferable that the controller is configured to generate the simulation monitor image data in response to the user input as real-time image data configured to enable real-time navigation on a monitor for changing the target region of the object for which the digital image data is to be generated. Thus, the user is enabled to operate the digital microscope system in a responsive and intuitive manner.

According to an embodiment of the present disclosure, the imaging device comprises at least one of a magnification changing system configured to change a magnification in accordance with the setting, a positioning device configured to change a lateral positioning of the object relative to the imaging device in accordance with the setting, and a focusing system configured to change a focusing state in accordance with the setting.

Preferably, the changeable setting of the magnification changing system comprises at least one of continuous magnification setting and a discrete magnification setting. Thus, it is possible to intuitively change the size of the target region to be imaged.

Preferably, the continuous magnification setting comprises at least one of an optical zoom setting and a digital zoom setting. Whereas an optical zoom setting enables the target region to be imaged with high image quality, a digital zoom setting allows a fast and low-cost adjustment of the size of the target region as no further optical elements are required for changing the magnification.

According to a preferred embodiment, when the user input for changing the magnification involves at least one of the discrete magnification setting and the optical zoom setting, the controller generates the simulation monitor image data to compensate for the delay in updating the monitor image data caused by the change of the respective setting. In this embodiment, changing the magnification may involve a mechanical movement of one or more optical elements, such a movement requiring a certain time to be completed. During the afore-mentioned time the monitor image to be expected upon completion of the magnification change can be digitally simulated on the monitor.

Preferably, when the user input for changing the magnification involves the digital zoom setting, the controller updates the monitor image data without compensating for any delay. In this embodiment, the magnification can be changed without mechanically moving any optical elements resulting enabling a rapid change of magnification. Thus, the imaging device is able to generate the digital image data so fast that the monitor image can be updated without any digital simulation.

In a preferred embodiment, the magnification changing system comprises at least first and second magnification changing subsystems forming a composite zoom system.

Preferably, the composite zoom system provides a magnification range being combined by a continuous magnification range provided by the first magnification changing subsystem and a plurality of discrete basis magnifications provided by the second magnification changing subsystem. By combining a continuous magnification range and discrete basis magnifications a large total magnification range can be provided in a manner which ensures a high image quality.

In the afore-mentioned embodiment, the imaging device may comprise a digital camera configured to operate as a digital zoom system, the digital camera forming the first magnification changing subsystem. Further, the imaging device may comprise a discrete magnification changer, the discrete magnification changer forming the second magnification changing subsystem. By combining a digital zoom system with a discrete magnification changer a large magnification range can be provided in an efficient manner.

Further, the discrete magnification changer may comprise a plurality of fixed magnification optical systems providing said plurality of discrete basis magnifications, each of the fixed magnification optical systems being selectively insertable into an optical path including the digital camera. In a preferred embodiment, the composite zoom system provides a total magnification range being composed of a first continuous magnification subrange provided by the first magnification subsystem and a second continuous magnification subrange provided by the second magnification changing subsystem.

In the afore-mentioned embodiment, the imaging device may comprise a first digital camera and a first optical magnification system, the first digital camera and the first optical magnification system being aligned along a first optical axis and forming the first magnification changing subsystem. Further, the imaging device may comprise a second digital camera and a second optical magnification system, the second digital camera and the second optical magnification system being aligned along a second optical axis and forming the second magnification changing subsystem. The first and second optical axes may be arranged parallel to each other. The imaging device may be movable relative to the object in a direction orthogonal to the first and second optical axes in order to selectively align one of the first and second magnification changing subsystems with the target region. At least one of the first and second digital cameras may be configured to operate as a digital zoom system or at least one of the first and second optical magnification systems may be an optical zoom system. In this embodiment, it is possible to realize a total magnification range being divided into several subranges, each of which being assigned to the respective magnification changing system. Thus, a large magnification range can be covered efficiently.

The first digital camera may be configured to operate as a digital zoom system and may have a first resolution. The first magnification system may be a fixed magnification optical system providing a first magnification. The second digital camera may be configured to operate as a digital zoom system and may have a second resolution being smaller than the first resolution. The second magnification system may be a fixed magnification optical system providing a second magnification being smaller than the first magnification. The first continuous magnification subrange may be an upper subrange of the total magnification range. The second continuous magnification subrange may be a lower subrange of the total magnification range. In this embodiment, the first digital camera may be used to generate a high-resolution image of the target region, whereas the second digital camera may be used to generate an overview image having a lower resolution. Thus, the digital microscope system allows convenient and efficient imaging of the object through a large magnification range.

The first magnification system may be an optical zoom system providing the first continuous magnification subrange. The second digital camera may be configured to operate as a digital zoom system. The second magnification system may be a fixed magnification optical system. The first continuous magnification subrange may be an upper subrange of the total magnification range. The second continuous magnification subrange may be a lower subrange of the total magnification range. In a preferred embodiment, the controller is configured to generate the simulation monitor image data based on the changed setting of at least one of the magnification changing system and the positioning device such that a center of the simulation monitor image corresponds to the target region determined by the changed setting. In this embodiment, the target region is always centered in the simulation monitor image facilitating the digital navigation through the object.

Preferably, the controller is configured to generate the simulation monitor image data based on the changed setting of at least one of the magnification changing system and the positioning device such that the simulation monitor image includes a dummy portion, said dummy portion corresponding to a region of the object which is not represented by the digital image data generated in accordance with the unchanged setting. By providing the afore-mentioned dummy portion, it can be avoided that the simulation monitor image includes empty image areas which otherwise would be present as no digital image data is yet available at the time when the simulation monitor image is displayed on the monitor. Thus, a responsive and intuitive operation of the digital microscope system is promoted.

In a preferred embodiment, the digital microscope system comprises a microscope stage on which the object is to be arranged, wherein the positioning device is configured to change a lateral positioning of the microscope stage relative to the imaging device in accordance with the setting. In this embodiment, the microscope stage may be moved in a direction orthogonal to the optical axis of the imaging device. Alternatively, the imaging device may be moved relative to the microscope stage.

The digital microscope system may comprise a monitor configured to display the monitor image and the simulation monitor image.

Further, the digital microscope system may comprise an input device configured to obtain the user input for changing the setting. The input device may comprise operating elements as a mouse, a joystick, a keyboard etc.

Further, the input device may include a touch screen being integrated with the monitor. By using a touch screen, the user can give a user input to the digital microscope system through simple or multi-touch gestures by contacting the touch screen with a special stylus or one or more fingers. By applying gestures such as a drag and drop gesture the user can easily navigate through the imaged object.

According to another aspect of the present disclosure, a method for operating a digital microscope system is provided. The method comprises the steps of generating digital image data representing a target region of an object, the target region being determined by a changeable setting; generating monitor image data corresponding to the digital image data generated in accordance with the setting, the monitor image data being configure to be displayed as a monitor image; changing the setting in response to a user input; and compensating for a delay in updating the monitor image data in accordance with the changed setting by storing the digital image data generated in accordance with the unchanged setting in response to the user input and generating simulation monitor image data by performing digital image processing on the stored digital image data taking into account the changed setting, the simulation monitor image data being configured to be displayed as a simulation monitor image during the delay.

According to another aspect of the present disclosure, a computer program with a program code is provided for performing the above method, when the computer program is run on a processor.

SHORT DESCRIPTION OF THE FIGURES

Hereinafter, preferred embodiments are described with reference to the drawings in which.

DETAILED DESCRIPTION

Figure 1:
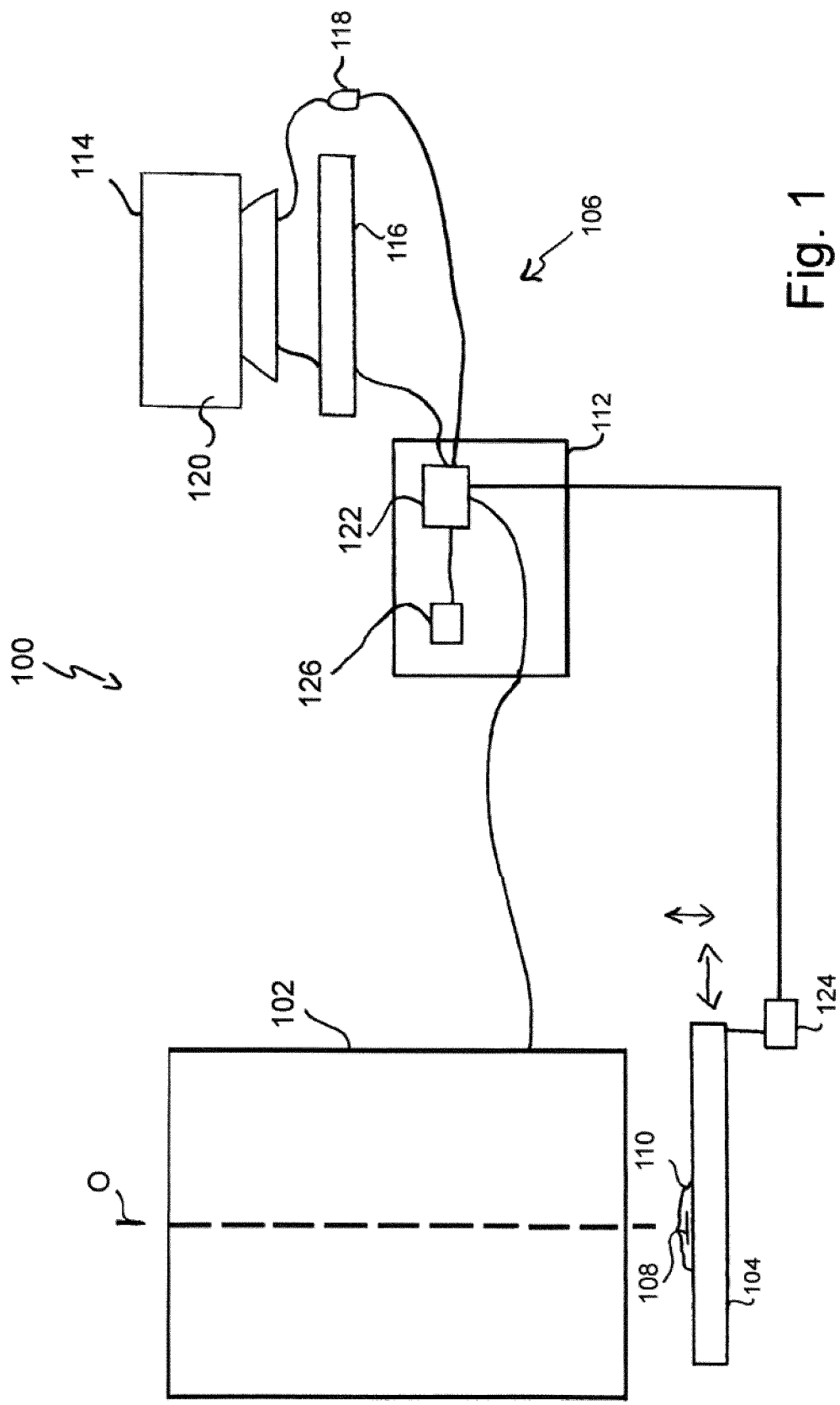
FIG. 1 is a diagram illustrating a configuration of a digital microscope system according to an embodiment of the present disclosure.

FIG. 1 is a diagram showing a digital microscope system 100 according to an embodiment of the present disclosure.

The digital microscope system 100 comprises an imaging device 102, a microscope stage 104 and a computer system 106. The imaging device 102 is configured to generate digital image data representing a target region 108 of an object 110 which is located on the microscope stage 104.

The computer system 106 comprises a processor 112, a monitor 114 and an input device which includes for example a keyboard 116 and a pointing device such as a computer mouse 118 etc. The input device may further comprise a touch screen which 120 is integrated with a screen of the monitor.

The processor 112 may comprise a controller 122 which is configured to control the overall operation of the digital microscope system 100. For this purpose, the controller 122 is connected to the individual components of the digital microscope system 100, in particular to the imaging device 102, the monitor 114, the keyboard 116 and the computer mouse 118. The controller 122 may further be connected to a positioning device 124 enabling a relative movement between the microscope stage 104 and the imaging device 102. In the present embodiment, the positioning device 124 may be configured to move the microscope stage 104 in a direction orthogonal to an optical axis O of the imaging device 102. Referring to a coordinate system including three orthogonal axes x, y, z, as shown in FIG. 1, the afore-mentioned lateral movement of the microscope stage 104 is parallel to a plane including the x axis and the y axis. The positioning device 124 may further be configured to move the microscope stage 104 in a direction parallel to the z axis, i.e. parallel to the optical axis O relative to the imaging device 102. With this axial movement, the positioning device 124 may serve as a focusing system determining an object plane including the target region 108 to be imaged by the imaging device 102. The afore-mentioned lateral and axial relative movements between the imaging device 102 and the microscope stage 104 are illustrated in FIG. 1 by double arrows.

The processor 112 may further include a memory 126 for storing digital image data generated by the imaging device 102 and representing the image target region 108 of the object 110.

The target region 108 of the object 110 to be imaged by the imaging device 102 is determined by a changeable setting of the imaging device 102. Such changeable setting may comprise at least one of a setting determining a lateral xy-position of the microscope stage 104 relative to the imaging device 102, a setting determining an axial z-position of the microscope stage 104 along the optical axis O relative to the imaging device 102, and a setting determining a magnification based on which an optical system (not shown in FIG. 1) included in the imaging device 102 images the target region 108 of the object, as explained below in more detail.

The setting of the imaging device 102 is being changed by the controller 122 in response to a user input performed by a user operating the input device, i.e. at least one of the keyboard 116, the computer mouse 118 and the touch screen 120 in the present disclosure. Herein, it is assumed that the change of the setting of the imaging device 102 performed by the controller 122 takes a certain time. In other words, it is assumed that there is a delay between the time at which the user input is received by the controller 122, and the time at which the change of setting of the imaging device 102 is completed so that the object 110 can be imaged in accordance with the new setting. In order to enable the user to perform a real-time navigation on the monitor 114 despite the afore-mentioned delay, the digital microscope system 100 according to the present embodiment may be operated according to an exemplary process flow as indicated in the flow diagram of FIG. 2.

Figure 2:
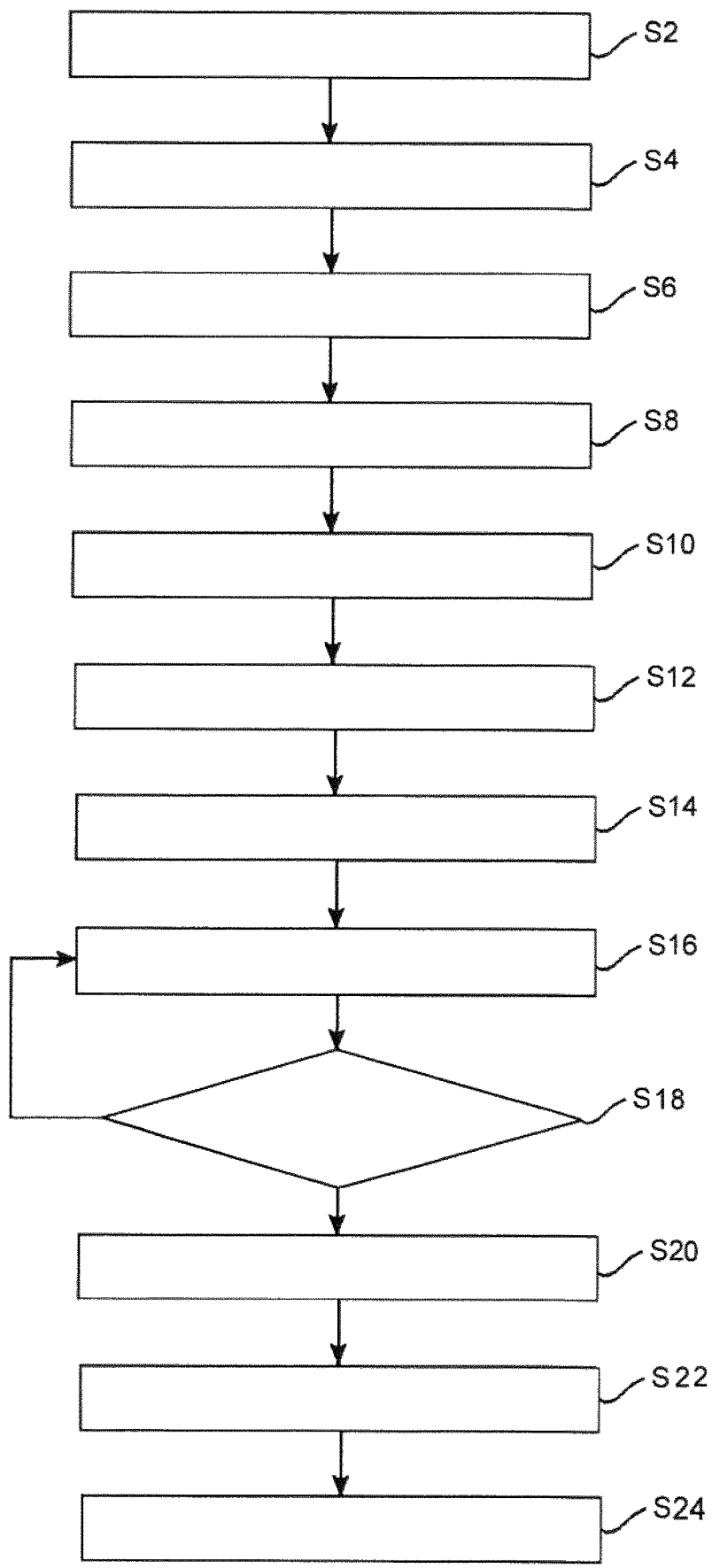
FIG. 2 is a flow diagram illustrating an exemplary process flow for operating the digital microscope system shown in FIG. 1.

The process flow shown in FIG. 2 starts with step S2 in which the imaging device 102 generates digital image data representing the target region 108 of the object 110. The target region 108 imaged by the imaging device 102 is determined by the current setting of the imaging device 102, for example by at least one of the lateral and axial positions of the microscope stage 104 relative to the imaging device 102 and the magnification based on which the imaging of the target region 108 is performed.

In step S4, the controller 122 generates monitor image data corresponding to the digital image data which has been generated in step S2 in accordance with the current setting. The monitor image data represents data which is configured to be displayed on the monitor 114 in form of a monitor image.

Based on the monitor image data generated in step S4, a live monitor image is displayed on the monitor in step S6.

With respect to the embodiment shown in FIG. 2, it is assumed that in step S8 the controller 122 receives a user input performed by the user of the digital microscope system 100 in order to change the setting of the imaging device 102.

Having received the user input, in step S10 the controller 122 stores the digital image data, which has been generated in step S2 in accordance with the unchanged setting, in the memory 126 of the processor 112. In other words, in step S10, the controller 122 freezes the digital image based on the unchanged setting.

In step S12, which may be performed simultaneously with step S10, the controller 122 starts to change the setting of the imaging device 102 according to the user input. For the present embodiment, it is assumed that the change of the setting of the imaging device 102 involves a delay starting from receiving the user input to the completion of updating the setting.

In step S14, the controller 122 performs digital processing on the image data stored in step S10 taking into account the changed setting in order to generate simulation monitor image data representing an approximation of a monitor image which is to be generated in accordance with the user input received in step S8.

In step S16, a simulation monitor image is displayed on the monitor 114, this simulation monitor image being represented by the simulation monitor image data generated in step S14. Step S16 is performed during the delay which occurs when the monitor image data is updated in accordance with the changed setting. In other words, displaying the simulation monitor image in step S16 serves to compensate for the afore-mentioned delay.

In step S18, it is determined whether or not the change of setting of the imaging device 102 is completed. If the change of setting is not yet completed, i.e. if the delay is still continuing, the process returns to step S16 so that the simulation monitor image is continued to be displayed on the monitor 114. On the other hand, if it is determined in step S18 that the change of setting has been completed, the process proceeds with step S20.

In step S20, the imaging device 102 generates new digital image data in accordance with the setting which has been changed based on the user input received in step S8.

In step S22, the controller 122 generates updated monitor image data corresponding to the digital image data which has been generated in step S20.

Finally, in step S24, an updated monitor image is displayed on the monitor, this updated monitor image being represented by the monitor image data generated in step S22.

As explained above referring to the exemplary process shown in FIG. 2, the controller 122 of the digital microscope system 100 is configured to generate the simulation monitor image data in response to the user input as real-time image data configured to enable real-time navigation on the monitor 114 for changing the target region 108 of the object 110 for which the digital image data is to be generated.

Figure 4:
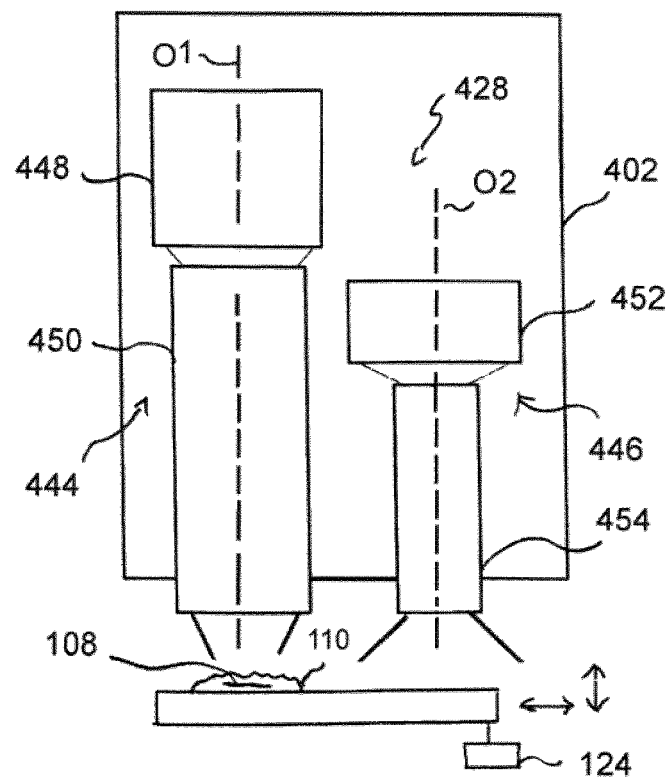
FIG. 4 is a diagram showing a further embodiment of the imaging device included in the digital microscope system shown in FIG. 1.
Figure 5:
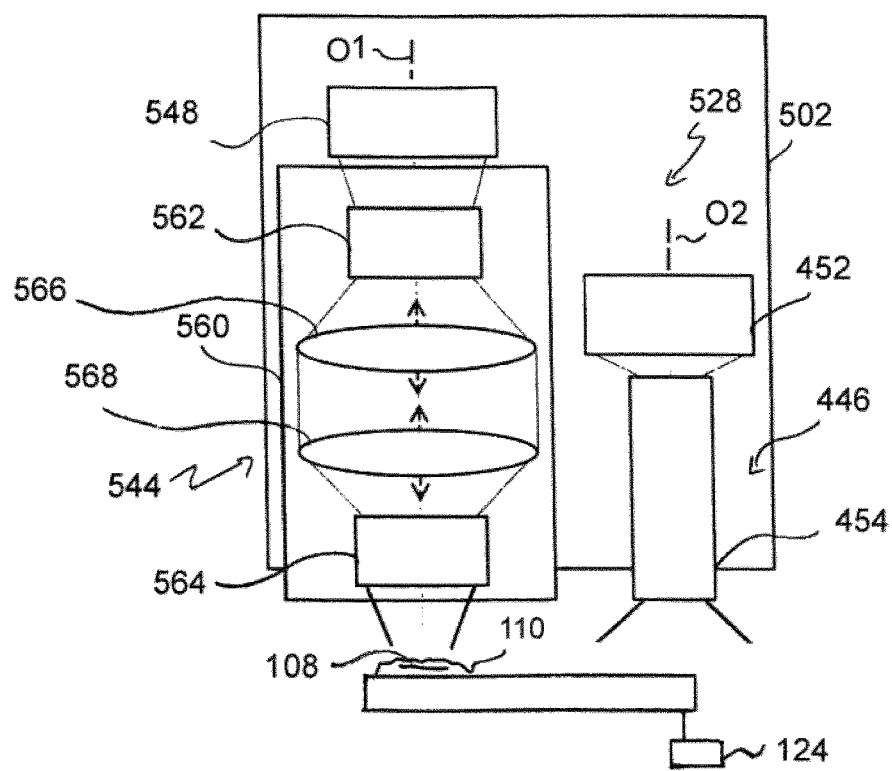
FIG. 5 is a diagram showing a further embodiment of the imaging device included in the digital microscope system shown in FIG. 1.

As described above with respect to the embodiment shown in FIG. 1, the setting of the imaging device 102 determining the target region 108 to be imaged may comprise a setting determining a magnification of the optical system included in the imaging device 102, a setting determining a lateral xy-positioning of the object 110 relative to the imaging device 102, and a setting determining an axial z-positioning of the object 110 relative to the imaging device 102, i.e. determining an object plane onto which the optical system of the imaging device 102 is focused. Hereinafter, different embodiments of the imaging device 102 shown in FIG. 1 are described with reference to FIGS. 3 to 5. The embodiments shown in FIGS. 3 to 5 are designed in particular to enable different magnification settings as explained below.

Figure 3:
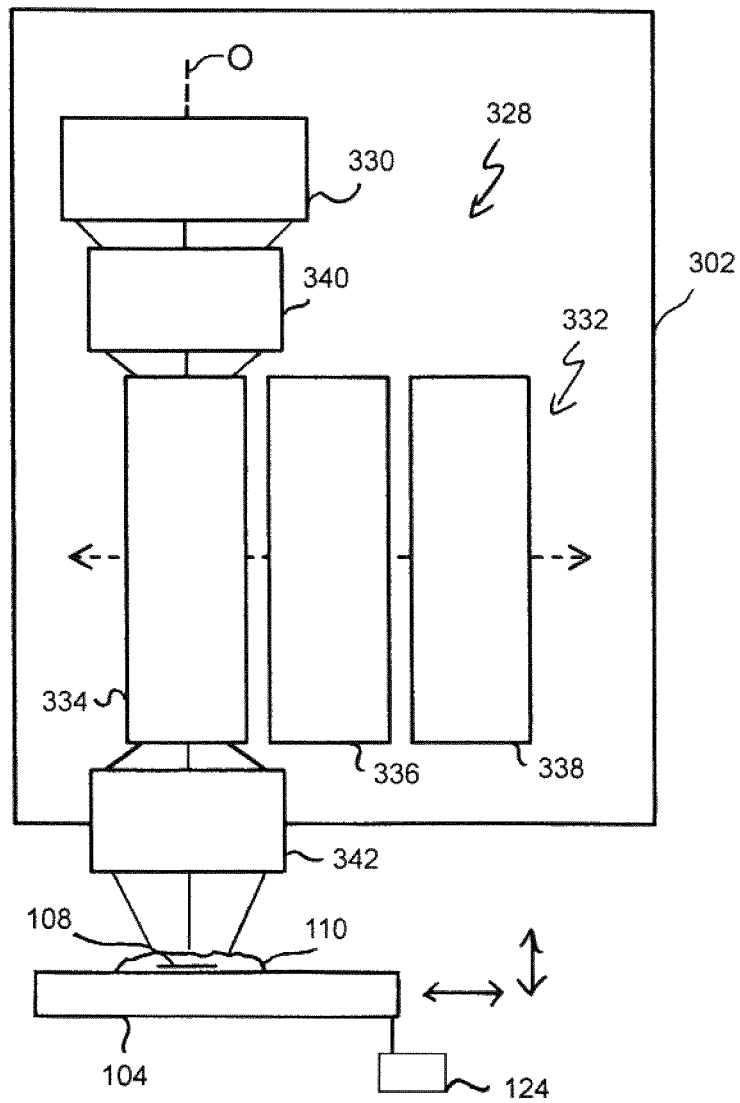
FIG. 3 is a diagram illustrating a specific embodiment of an imaging device included in the digital microscope system shown in FIG. 1.

FIG. 3 shows an imaging device 302 representing a specific embodiment of the imaging device 102 provided in the digital microscope system 100 shown in FIG. 1.

The imaging device 102 includes a magnification changing system generally designated with reference sign 328 in FIG. 3. As explained hereinafter, a changeable setting of the magnification changing system 328 comprises at least one of a continuous magnification setting, i.e. a zoom setting, and a discrete magnification setting, i.e. a stepwise magnification setting. In the embodiment shown in FIG. 3, the aforementioned continuous magnification setting may comprise a digital zoom setting.

In particular, the magnification changing system 328 shown in FIG. 3 comprises a first magnification changing subsystem 330 which may formed by a digital camera. The digital camera 330 is configured to operate as a digital zoom system. The magnification changing system 328 further comprises a second magnification changing subsystem 332 which is formed by a discrete magnification changer. The discrete magnification changer 332 comprises a plurality of fixed magnification optical systems 334, 336, 338. Each of the fixed magnification optical systems is formed by an optical system providing a fixed magnification. Thus, the plurality of fixed magnification optical systems 334, 346, 338 provide a plurality of different discrete basis magnifications. In order to selectively set one of these basis magnifications, each of the fixed magnification optical systems 334, 336, 338 is selectively insertable into an optical path in which the digital camera 330 is located. In FIG. 3, the afore-mentioned optical path is represented by the optical axis O leading from the target region 108 to the digital camera 330.

In the embodiment shown in FIG. 3, the magnification changing system 328 may include a tube lens 340 located between the digital camera 330 and the fixed magnification optical system 334 currently positioned on the optical axis O. Further, the magnification changing system 328 may include an objective lens 342 facing towards the microscope stage 104. Whereas the fixed magnification optical systems 334, 336, 336 are movable orthogonal to the optical axis O, the digital camera 330, the tube lens 340 and the objective lens 342 are stationary within the imaging device 302 shown in FIG. 3.

The first magnification changing subsystem comprising the digital camera 330 and the second magnification changing subsystem comprising the discrete magnification changer 332 form together a composite zoom system. The composite zoom system provides a magnification range which is combined by a continuous magnification range provided by the digital camera 330, which operates as a digital zoom system, and the plurality of different discrete basis magnifications provided by the fixed magnification optical systems 334, 336, 338 which can be selectively inserted into the optical path O leading from the target region 108 to be imaged to the digital camera 330.

Preferably, the digital camera 330 forms a high-resolution image sensor which provides, in combination with the discrete magnification changer 332 including the plurality of fixed magnification optical systems 334, 336, 338, a continuous zoom system. Specifically, the discrete magnification changer 332 provides the discrete basis magnifications representing several successive magnification steps wherein the digital camera 330 ensures a stepless digital zoom between two adjacent magnification steps. Switching between the discrete basis magnifications is performed in response to the user input as described above.

In the embodiment shown in FIG. 3, the digital zoom operation between two discrete magnification steps may be performed in real-time. Thus, the digital camera 330 may be able to perform its digital zoom operation virtually without any delay. As a result, when the user input for changing the magnification involves only the digital zoom setting, the controller 122 updates the monitor image data without compensating for any delay. In this respect, it is to be noted that the live image displayed on the monitor 114 is scaled and trimmed according to the currently desired magnification. The digital camera 330 being a high-resolution image sensor ensures the necessary resolution also in a cropped image even at maximum digital magnification.

On the other hand, when changing the lateral positioning of the discrete magnification changer 332 orthogonal to the optical axis O in response to the user input, the live image on the monitor 114 is frozen by storing the corresponding digital image data in the memory 126 of the processor 112. Then, as explained above with reference to FIG. 2, the magnification change induced by the user input is digitally simulated in the meantime by image processing the stored image data and displaying the corresponding simulation monitor image resulting therefrom on the monitor 114. As soon as the target magnification of the discrete magnification changer corresponding to the user input has been reached, the controller 122 switches back to the updated live image.

The step size of the discrete magnification changer 332 is adjusted to the zoom range of the digital zoom realized by the digital camera 330. The zoom range in turn depends on the resolution of the digital camera 330 and the resolution of the image displayed on the monitor 114.

As further indicated in FIG. 3, the change of setting of the imaging device 302 may also involve an operation for positioning the microscope stage 104 relative to the optical system included in the imaging device 302. For this, the positioning device 124 may be controlled in response to the user input to change the relative position between the imaging device 302 and the microscope stage 104 either in a direction orthogonal to the optical axis O or in a direction along the optical axis or in both directions.

According to the specific embodiment shown in FIG. 3, the discrete magnification changer 332 comprises three fixed magnification optical systems 334, 336, 338. Needless to say that the discrete magnification changer 332 may comprise any other number of fixed magnification optical systems, provided that this number is larger than one.

FIG. 4 shows an imaging device 402 which is a further specific embodiment of the imaging device 102 provided in the digital microscope system 100 shown in FIG. 1.

The imaging device 402 shown in FIG. 4 comprises a magnification changing system 428 including a first magnification changing subsystem 444 and a second magnification changing subsystem 446. The first magnification changing subsystem 444 includes a first digital camera 448 and a first optical magnification system 450 wherein the first digital camera 448 and the first optical magnification system 450 are aligned along a first optical axis O1. Likewise, the second magnification changing subsystem 446 includes a second digital camera 452 and a second optical magnification system 454. The second digital camera 452 and the second optical magnification system 454 are aligned along a second optical axis O2. The afore-mentioned first and second optical axes O1, O2 are arranged parallel to each other. By means of the positioning device 124, the imaging device 402 is movable relative to the object 110 in a direction orthogonal to the first and second optical axes O1, O2 in order to selectively align one of the first and second magnification changing subsystems 444, 446 with the target region 108. At least one of the first and second cameras 448, 452 may be configured to operate as a digital zoom system. Alternatively, at least one of the first and second optical magnification systems 450, 454 may be configured to operate as an optical zoom system.

More specifically, according to the embodiment shown in FIG. 4, the first digital camera 448 may be configured to operate as a digital zoom system and may have a first resolution. Further, the first magnification system 450 may be a fixed magnification optical system provided a first fixed magnification. Further, the second digital camera 452 may be configured to operate as a digital zoom system and may have a second resolution which is smaller than the first resolution of the first digital camera 448. The second magnification system 454 may be a fixed magnification optical system providing a second fixed magnification which is smaller than the first magnification.

The magnification changing system 428 shown in FIG. 4 forms a composite zoom system providing a total magnification range which is comprised of an upper subrange and a lower subrange. The upper subrange of the total magnification range is formed by a first continuous magnification subrange which is provided by the first magnification changing subsystem 444. Likewise, the lower subrange of the total magnification range is formed by a second continuous magnification subrange which is provided by the second magnification changing subsystem 446.

As explained above, the embodiment shown in FIG. 4 comprises the two digital cameras 448 and 452, wherein the first digital camera 448 forms a high-resolution image sensor. Thus, the first digital camera 448, which is configured to perform a digital zoom operation, cooperates with the first fixed magnification optical system 450 to cover the upper subrange of the total magnification range. In contrast, the second digital camera 452 may be used as an overview camera. Further, the second fixed magnification optical system 454 may be used as a wide field optical system. Thus, the second digital camera 452 and the second fixed magnification optical system 454 may cooperate to cover the lower subrange of the total magnification range.

In order to set one of the upper and lower subranges of the total magnification range, the corresponding one of the first and second magnification changing subsystems 444, 446 is selectively aligned with the target region 108. For this, the microscope stage 104 may be moved laterally in a direction orthogonal to the optical axis O1 and O2. Alternatively, the imaging device 102 may be moved relative to the microscope stage 104.

When the imaging device 402 and the microscope stage 104 are laterally moved relative to each other for aligning one of the first and second magnification changing subsystems 444, 446 with the target region 108, a delay may occur before the setting is completed. The corresponding delay in updating the monitor image displayed on the monitor 114 can be compensated as described with reference to FIG. 2. As a result, the switching between the two magnification changing subsystems 444, 446 can be carried out without being noticed by the user.

Needless to say that the embodiment shown in FIG. 4 is not limited to two digital camera systems. Rather, the concept described herein can be extended to more than two camera systems. Likewise, the total magnification range may be divided in more than two subranges.

FIG. 5 shows an imaging device 502 which is a further specific embodiment of the imaging device 102 provided in the digital microscope system 100 illustrated in FIG. 1.

Compared to the embodiment shown in FIG. 4, the imaging device 502 of FIG. 5 is modified in that the high-resolution camera system of FIG. 4, which performs a digital zoom operation and covers the upper subrange of the total magnification range, is replaced by a camera system which, on the one hand, has a lower resolution and, on the other hand, is configured to provide an optical zoom function.

Specifically, the imaging device 502 shown in FIG. 5 includes a magnification changing system 528 comprising a first magnification changing subsystem 544. The first magnification changing subsystem 544 includes a first digital camera 548 having a first resolution which is lower than the resolution of the digital camera 448 shown in FIG. 4. The first magnification changing subsystem 544 further comprises a first magnification system 560 operating as an optical zoom system. The optical zoom system formed by the first magnification system 560 provides the first continuous magnification subrange. The first magnification system 560 comprises a tube lens 562 facing towards the first digital camera 548 and an objective lens 564 facing towards the microscope stage 104. The first magnification system 560 further comprises two lens elements 566, 568 which can be moved along the optical axis O1 for changing the magnification. The first magnification system 560 may be further configured to enable a combined zooming and focusing operation by moving the two lens elements 566, 569 independently from each other along the optical axis O1.

Apart from the afore-mentioned configuration of the first magnification changing subsystem system 554, the imaging device 502 shown in FIG. 5 is identical to the imaging device 402 shown in FIG. 4. In particular, the switching between the first and second magnification changing subsystems 544, 446 is performed as described with respect to the embodiment shown in FIG. 4. Further, as the user input for changing the magnification may involve a change of the optical zoom setting of the first magnification changing subsystem 544, the controller 122 may generate simulation monitor image data to compensate for the delay in updating the monitor image caused by the change of the optical zoom setting as described with reference to FIG. 2.

Figure 6:
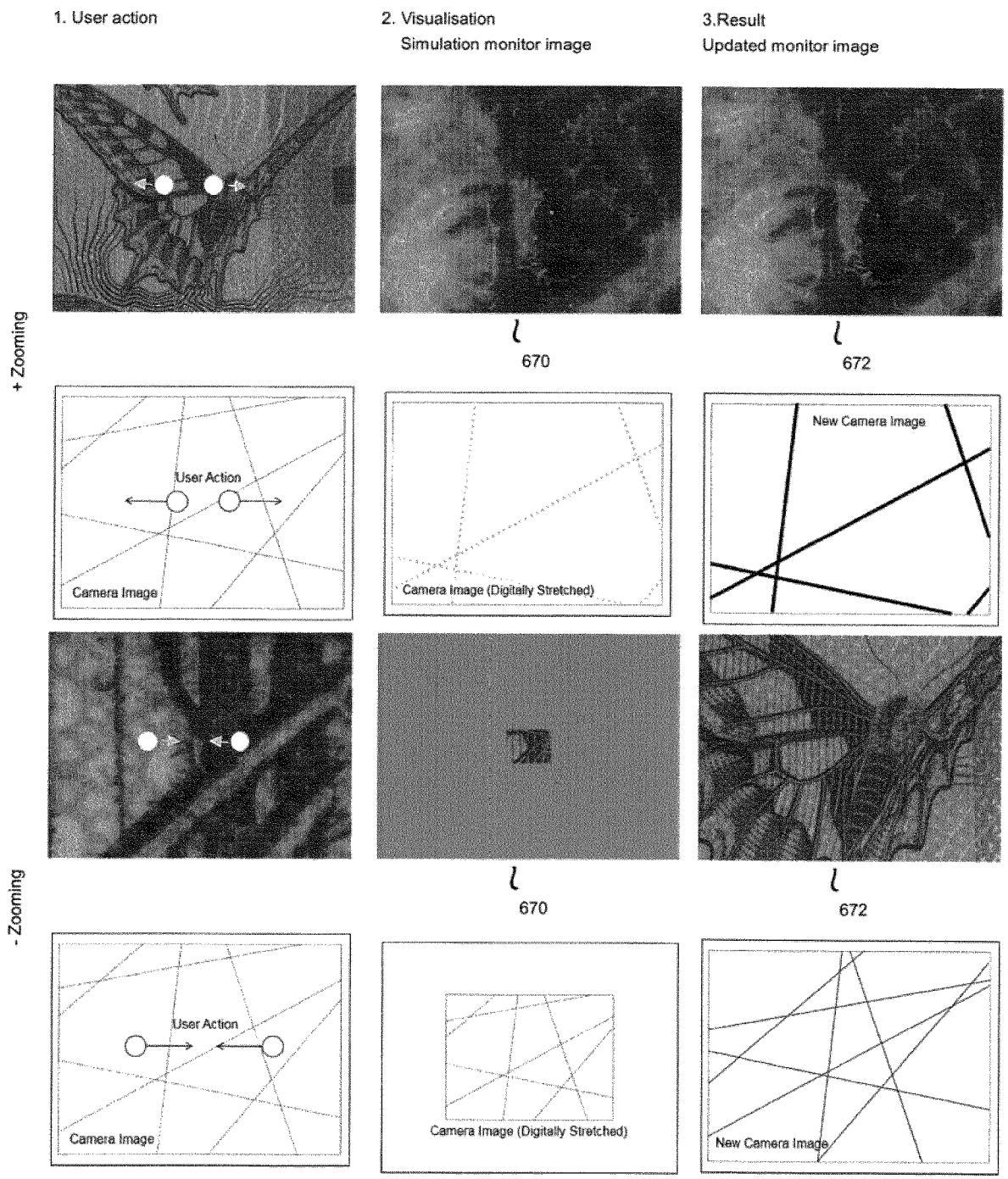
FIG. 6 is a diagram illustrating an example for a real-time navigation performed by means of the digital microscope system shown in FIG. 1.
Figure 7:
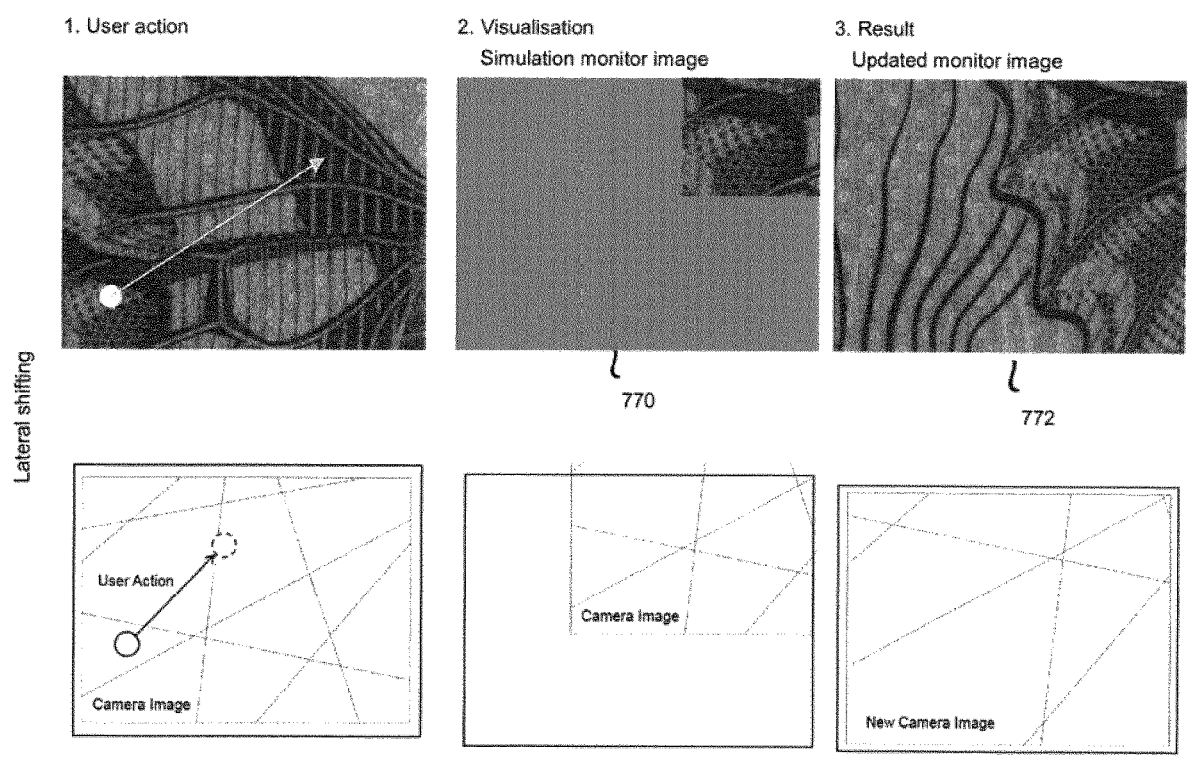
FIG. 7 is a diagram illustrating a further example for real-time navigation performed by means of a digital microscope system shown in FIG. 1.

FIGS. 6 and 7 show different examples for the real-time navigation on the monitor 114 which is applied for adjusting the target region 108 of the object 110 to be imaged by the imaging device 102. Specifically, FIG. 6 shows an example in which the magnification is changed in accordance to a corresponding user input being performed to enlarge or reduce the monitor image. FIG. 7 shows an example in which the lateral xy-position of the microscope stage 104 relative to the imaging device 102 is changed in response to a user input being performed to laterally shift the monitor image. The user action, i.e. the user input may be carried out by means of any of the elements included in the input device, e.g. the computer mouse 118 by operating a mouse wheel, the touch screen 120 by applying a simple or multi-touch gesture, the keyboard 116, a 3D mouse using a joystick etc.

FIG. 6 shows in the left column the user action, i.e. the user input performed by the user by means of the input device, in the middle column the real-time visualization on the monitor during the delay, i.e. a simulation monitor image 670, and in the right column the result after the delay, i.e. a monitor image 672 updated in accordance with the changed setting. Further, FIG. 6 shows in the upper half a change of the zoom setting for increasing the magnification ("+" in FIG. 6), and in the lower half a change of the zoom setting for decreasing the magnification ("−" in FIG. 6).

In order to provide a visualization on the monitor 114 during the zoom change corresponding to the user action, when starting the user action the current live image is frozen, and its content is displayed and scaled according to a current target position. This visualization procedure is repeatedly performed in real-time so that the user can receive a visual feedback during the user action. When zooming is performed in a positive direction, individual pixels of the frozen image content may become visible during fast changes of the setting. While the virtually magnified or reduced image, i.e. the simulation monitor image 670 is displayed, the physical setting of the magnification changing system is varied towards the desired magnification corresponding to the user action. If the desired magnification is reached, the simulation monitor image 670 is replaced by a monitor image 672 updated according to the changed setting, and the updated monitor image 672 is displayed on the monitor. The afore-mentioned operations may be repeated as often as desired during the user action.

In the example according to FIG. 7, the user input, i.e. the user action for laterally moving the microscope stage 104 relative to the imaging device 102 is performed directly on the monitor image as in the example shown in FIG. 6.

In order to provide a visualization on the monitor 114 during the lateral movement corresponding to the user action, when starting the user action the current live image is frozen, and its content is displayed with a lateral offset corresponding to a current target position. This visualization procedure is repeatedly performed in-real time so that the user can receive a visual feedback during the user action.

While the lateral movement is represented by a simulation monitor image 770, the physical setting of the imaging device 102 is changed towards a desired target position. Once the desired target position is reached, the simulation monitor image 772 is replaced with a monitor image 772 updated in accordance with the setting changed by the user input. The afore-mentioned operations may be repeated as often as desired during the user action.

It is to be noted that in the examples shown in FIGS. 6 and 7 grey image areas including no image information correspond to regions of the object 110 which have not yet been captured by the imaging device 102. In other words, the afore-mentioned grey image areas correspond to regions of the object 110 which are not represented by the digital image data generated in accordance with the setting which has not yet been changed by the user input. Such a grey image area represents a dummy portion which is generated within the simulation monitor image.

The exemplary real-time navigation procedures shown in FIGS. 6 and 7 can be combined with each other. For example, referring to the example shown in FIG. 6, a center of the zoom operation may be determined by the position of the user input in the monitor image. This may be achieved implicitly through the position of the gesture on the touch screen 120. Preferably, this position remains unchanged during the entire zoom process. Accordingly, a lateral movement of the microscope stage 104 relative to the imaging device 102 may take place synchronously with the zoom operation. This lateral movement takes place again by virtually, i.e. digitally moving the monitor image on the one hand and physically moving the microscope stage 104 relative to the imaging device 102 on the other hand.

According to the embodiments described above, a temporal decoupling between a user interface and hardware components of the digital microscope system 100 is enabled during a user input. It may be assumed that a live image of the object is not relevant during the user action. Thus, it may be sufficient to provide a frozen image as described above. Thus, hardware requirements can be reduced significantly, in particular in terms of latency requirements. In other words, it may be sufficient for the live image to be updated only after the change of the setting in accordance with the user input has been completed. Therefore, it may be preferable not to generate any intermediate images during the user action.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a processor, a microprocessor, a programmable computer or an electronic circuit. In some embodiments, some one or more of the most important method steps may be executed by such an apparatus.

Depending on certain implementation requirements, embodiments of the disclosure can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the disclosure comprise a data carrier having electronically readable control signals, which are capable of cooperating with a programmable computer system, such that one of the methods described herein is performed.

Generally, embodiments of the present disclosure can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the present disclosure is, therefore, a computer program having a program code for performing one of the methods described herein, when the computer program runs on a computer.

A further embodiment of the present disclosure is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present disclosure is an apparatus as described herein comprising a processor and the storage medium.

A further embodiment of the disclosure is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the disclosure comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

Throughout the present disclosure, wordings as for example "doing something by" is to be interpreted broadly as an open term such as "comprising" but not as a closed term such as "consisting of".

LIST OF REFERENCE SIGNS 100 digital microscope system
102 imaging device
104 microscope stage
106 computer system
108 target region
110 object
112 processor
114 monitor
116 keyboard
118 computer mouse
120 touch screen
122 controller
124 positioning device
126 memory
302 imaging device
328 magnification changing system
330 digital camera
332 discrete magnification changer
334 fixed magnification optical system
336 fixed magnification optical system
338 fixed magnification optical system
340 tube lens
342 objective lens
402 imaging device
444 magnification changing subsystem
446 magnification changing subsystem
448 digital camera
450 optical magnification system
452 digital camera
454 optical magnification system
502 imaging device
528 magnification changing system
544 magnification changing subsystem
548 digital camera
560 magnification optical system
562 tube lens
564 objective lens
566 lens element
568 lens element
670 simulation monitor image
672 monitor image
770 simulation monitor image
772 monitor image
O optical axis O1 optical axis
O2 optical axis

What is claimed is:

1. A digital microscope system, comprising:
an imaging device configured to generate digital image data representing a target region of an object, the target region being determined by a changeable setting of the imaging device; and
a controller configured to generate monitor image data corresponding to the digital image data generated in accordance with the setting, the monitor image data being configured to be displayed as a monitor image;
wherein the controller is further configured to change the setting in response to a user input;
wherein the controller is further configured to compensate for a delay in updating the monitor image data in accordance with the changed setting by:
storing the digital image data generated in accordance with the unchanged setting in response to the user input and generating simulation monitor image data by performing digital image processing on the stored digital image data taking into account the changed setting, the simulation monitor image data being configured to be displayed as a simulation monitor image during the delay;
wherein the imaging device comprises a magnification changing system configured to change a magnification in accordance with the setting;
wherein the magnification changing system comprises at least first and second magnification changing subsystems forming a composite zoom system;
wherein the composite zoom system provides a total magnification range being composed of a first continuous magnification subrange provided by the first magnification changing subsystem and a second continuous magnification subrange provided by the second magnification changing subsystem;
wherein the imaging device comprises a first digital camera and a first optical magnification system, the first digital camera and the first optical magnification system being aligned along a first optical axis and forming the first magnification changing subsystem;
wherein the imaging device comprises a second digital camera and a second optical magnification system, the second digital camera and the second optical magnification system being aligned along a second optical axis and forming the second magnification changing subsystem;
wherein at least one of the first and second digital cameras is configured to operate as a digital zoom system or at least one of the first and second optical magnification systems is an optical zoom system;
wherein the first and second optical axes are arranged parallel to each other; and
wherein the imaging device is movable relative to the object in a direction orthogonal to the first and second optical axes in order to selectively align one of the first and second magnification changing subsystems with the target region.

2. The digital microscope system according to claim 1, wherein the controller is configured to generate the simulation monitor image data in response to the user input as real-time image data configured to enable real-time navigation on a monitor for changing the target region of the object for which the digital image data is to be generated.

3. The digital microscope system according to claim 1, wherein the imaging device comprises at least one of a positioning device configured to change a lateral positioning of the object relative to the imaging device in accordance with the setting, and a focusing system configured to change a focusing state in accordance with the setting.

4. The digital microscope system according to claim 3, wherein the changeable setting of the magnification changing system comprises at least one of a continuous magnification setting and a discrete magnification setting, and
wherein the continuous magnification setting comprises at least one of an optical zoom setting and a digital zoom setting.

5. The digital microscope system according to claim 4, wherein, when the user input for changing the magnification involves at least one of the discrete magnification setting and the optical zoom setting, the controller generates the simulation monitor image data to compensate for the delay in updating the monitor image data caused by the change of the respective setting.

6. The digital microscope system according to claim 1, wherein the composite zoom system provides a magnification range being a combination of a continuous magnification range provided by the first magnification changing subsystem and a plurality of discrete basis magnifications provided by the second magnification changing subsystem.

7. The digital microscope system according to claim 1, wherein
the first digital camera is configured to operate as a digital zoom system and has a first resolution,
the first optical magnification system is a fixed magnification optical system providing a first magnification,
the second digital camera is configured to operate as a digital zoom system and has a second resolution being smaller than the first resolution,
the second optical magnification system is a fixed magnification optical system providing a second magnification being smaller than the first magnification,
the first continuous magnification subrange is an upper subrange of the total magnification range, and
the second continuous magnification subrange is a lower subrange of the total magnification range.

8. The digital microscope system according to claim 1, wherein
the first optical magnification system is an optical zoom system providing the first continuous magnification subrange,
the second digital camera is configured to operate as a digital zoom system,
the second magnification system is a fixed magnification optical system,
the first continuous magnification subrange is an upper subrange of the total magnification range, and
the second continuous magnification subrange is a lower subrange of the total magnification range.

9. A method for operating the digital microscope system of claim 1, comprising the steps of:
generating digital image data representing a target region of an object, the target region being determined by a changeable setting;
generating monitor image data corresponding to the digital image data generated in accordance with the setting, the monitor image data being configured to be displayed as a monitor image;
changing the setting in response to a user input; and
compensating for a delay in updating the monitor image data in accordance with the changed setting by:
storing the digital image data generated in accordance with the unchanged setting in response to the user input and generating simulation monitor image data by performing digital image processing on the stored digital image data taking into account the changed setting, the simulation monitor image data being configured to be displayed as a simulation monitor image during the delay.

10. A non-transitory computer-readable medium storing a computer program comprising instructions which, when the instructions are executed by a processor, cause the processor to perform the method according to claim 9.

* * * * *